United States Patent
Liu

(10) Patent No.: US 6,618,329 B2
(45) Date of Patent: Sep. 9, 2003

(54) DIGITAL AUDIO SIGNAL PLAYER HAVING A SIMULATED ANALOGUE RECORD

(75) Inventor: Han-Chih Liu, Tainan (TW)

(73) Assignee: Hanpin Electron Co., Ltd., Tainan (TW)

(*) Notice: Subject to any disclaimer, the term of this patent is extended or adjusted under 35 U.S.C. 154(b) by 0 days.

(21) Appl. No.: 09/939,616

(22) Filed: Aug. 28, 2001

(65) Prior Publication Data

US 2003/0043701 A1 Mar. 6, 2003

(51) Int. Cl.$^7$ ................................................ H04B 1/20
(52) U.S. Cl. ............................................ 369/4; 381/119
(58) Field of Search ......................... 369/30.23, 4, 2.1, 369/3, 5, 47.16, 47.23, 47.24, 47.29, 60.01; 381/119, 120, 80

(56) References Cited

U.S. PATENT DOCUMENTS

| | | | |
|---|---|---|---|
| 5,502,703 A | * 3/1996 | Yamada et al. | 369/60 |
| 5,675,557 A | * 10/1997 | Hubinger | 369/4 |
| 6,058,079 A | * 5/2000 | Usui | 369/32 |
| 6,434,100 B1 | * 8/2002 | Usui | 369/53.31 |
| 6,535,462 B1 | * 3/2003 | Liu | 369/4 |

FOREIGN PATENT DOCUMENTS

| | | | |
|---|---|---|---|
| GB | 2-139762 A | * 11/1984 | 369/4 |
| JP | 6-89501 A | * 3/1994 | 369/4 |
| JP | 2000-182318 | * 6/2000 | 369/4 |
| WO | 97/01168 | * 1/1997 | 369/4 |

* cited by examiner

Primary Examiner—Tan Dinh
(74) Attorney, Agent, or Firm—Rosenberg, Klein & Lee

(57) ABSTRACT

A digital audio signal player having a simulated analogue record includes a laser pick-up used for reading the data of an analogue CD, a microprocessor, a digital audio signal processor electrically connected to the microprocessor, a digital/analog converter electrically connected to the audio signal processor, and a turnable control element. The data of the CD is stored in a RAM of the audio signal processor. The control element is made of conductive materials, and electrically connected to both the audio signal processor and the microprocessor, and can send a glitch to the microprocessor when touched by the user's hands. The microprocessor will make the audio signal process and send out the data on detecting that the difference between the glitch and an original signal exceeds a preset amount. The control element has a sensor for sensing the rotating speed and direction thereof so as to make the audio signal processor to process and send out the data according to the movement of the control element. Thus, the user can rotate the control element with the hands to decide on the items of the music and the playing speed and direction so as to play the music with changed tone and speed. The music is played in the original normal way as soon as the user removes the hands from the control element for disappearance of the glitch.

1 Claim, 1 Drawing Sheet

DIGITAL AUDIO SIGNAL PLAYER HAVING A SIMULATED ANALOGUE RECORD

BACKGROUND OF THE INVENTION

The present invention relates to a digital audio signal player having a simulated analogue record, and more particularly to one, which is equipped with a turnable control element for the DJ to turn to make the same simulate an analogue record being moved on the turntable by the DJ to play music with changed tone and speed, and which can start playing music in a normal way as soon as the DJ stops moving the control element.

In order to make the music provide lively and exciting atmosphere to the audience of a concert or the members of a party such as is held in a PUB or a dance hall, the DJ would move the analogue record being played on the record player in various ways so as to make the record player play music with changed tone and speed. When the DJ stops moving the record, the record player will play the record in the normal way immediately.

However, one analogue record has very limited capacity for storing music, therefore the DJ has to prepare a lot of analogue records in each party, and the large amount of records, being large in size and heavy in weight, are likely to cause his or her inconvenience.

Another kind of compact discs are provided, which can contain more music than the analogue records, and become very popular. However, the compact discs can not be moved by the DJ's hand when they are being played on a CD player, therefore the music can't be played with changed tone and speed to provide the party with more lively and exciting atmosphere.

SUMMARY OF THE INVENTION

Therefore, it is a main object of the present invention to provide a digital audio signal player with a simulated analogue record which can store many pieces of music from a CD, and can play the music with changed tone and speed when a DJ turns a turnable control element thereof to simulate the CD being moved when it is played in a CD player.

The digital audio signal player with a simulated analogue record of the present invention includes a driving IC, a CD driving motor, a laser pick-up, a high frequency amplifier, a CD digital processor, a microprocessor, a digital audio signal processor, a turnable control element a digital/analog converter and a low pass filter.

The CD driving motor is electrically connected to the driving IC for rotating a turntable, on which an analogue CD is positioned. The microprocessor is electrically connected to both the high frequency amplifier and the CD digital processor. The amplifier can send out laser light when activated by the Microprocessor. The laser pick-up starts reading data of the CD on activation of the CD digital processor, to which the pick-up is electrically connected. When the laser light is focused, the microprocessor will activate the CD digital processor to make the driving motor rotate the CD at twice a normal speed. The pick-up sends data to the digital audio signal processor, which is electrically connected to both the CD digital processor and the microprocessor. The audio signal processor includes a dynamic RAM. The digital/analog converter is electrically connected to the audio signal processor and the low pass filter.

The turnable control element is made of conductive materials, and electrically connected to both the audio-signal processor and the microprocessor, so as to send a glitch to the microprocessor when touched by the hands of a user. The microprocessor will make the audio signal processor process and send out the digital data on detecting that the difference between the glitch and a normal signal exceeds a preset amount; the control element has a sensor for sensing the rotating speed and direction of the control element so as to make the audio signal processor to process and send out the data in a manner according to the movement of the control element. The data are sent to the digital/analog converter to be converted into analogue ones and played as music with the filter after the conversion.

Thus, the user can rotate the control element with the hands to decide on an item of the music to be played, and speed and direction of the item to be played so as to play the music with changed tone and speed. The music is played in the original normal way as soon as the user removes the hands from the control element for disappearance of the glitch.

BRIEF DESCRIPTION OF THE DRAWING

This invention will be better understood by referring to the accompanying drawing, wherein.

DETAILED DESCRIPTION OF THE PREFERRED EMBODIMENT

Figure 1:
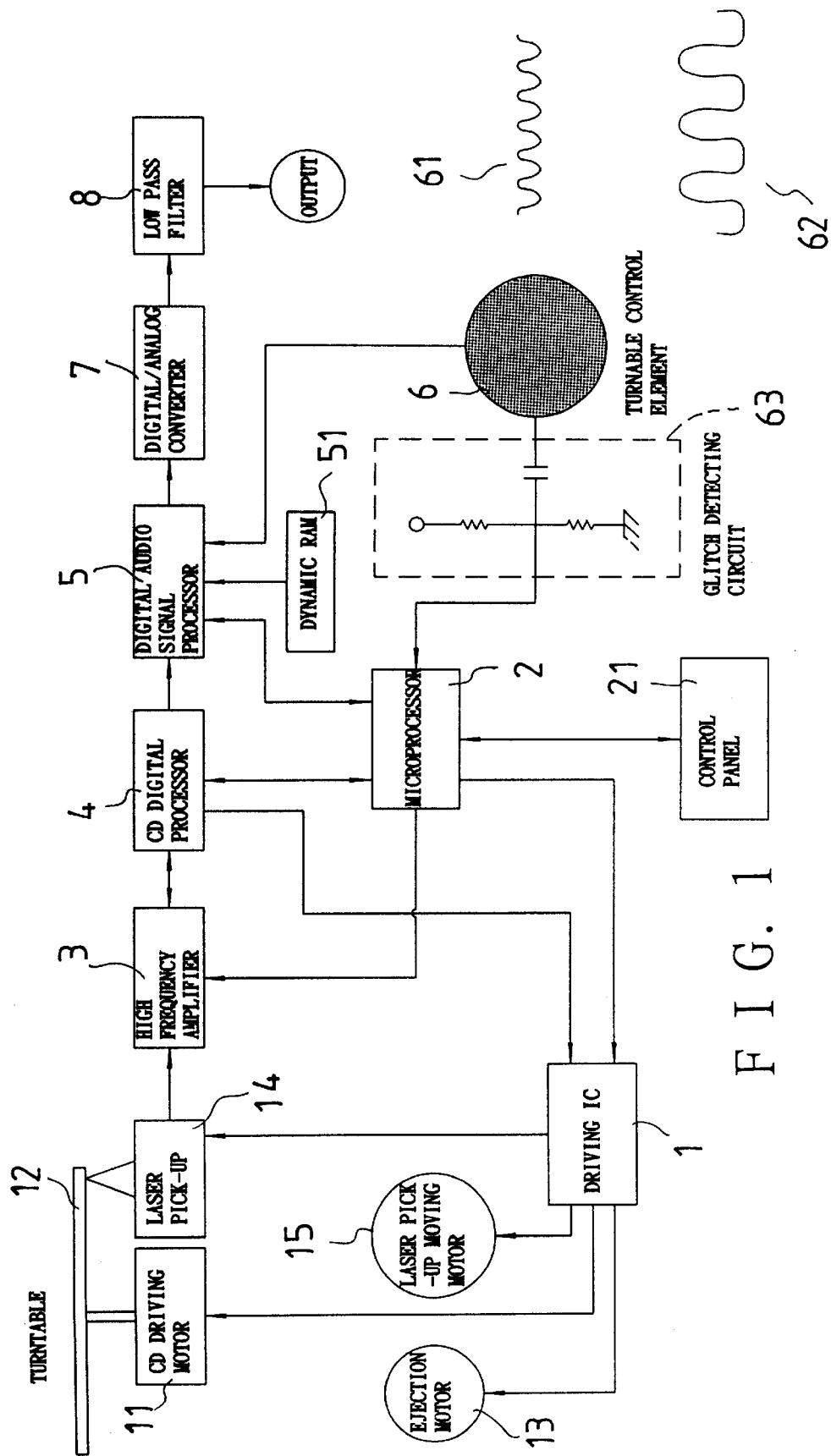
FIG. 1 is a block diagram of the circuit of the digital audio signal player having a simulated analogue record of the present invention.

Referring to FIG. 1, a digital audio signal player having a simulated analogue record of the present invention includes a driving IC 1, a CD driving motor 11, a turntable 12, an ejection motor 13, a laser pick-up 14, a laser pick-up moving motor 15, a microprocessor 2, a control panel 21, a high frequency amplifier 3, a CD digital processor 4, a digital audio signal processor 5, a dynamic RAM 51, a digital/analog converter 7, a turnable control element 6, a glitch detecting circuit 63 and a low pass filter 8.

The present invention aims at simulating a CD being moved by a user when it is played in a CD player so as to play music with changed tone and speed, therefore, those of the above devices and circuits are not detailed here that belong to the known arts and are not the subject of the present invention.

The turnable 12 is provided for holding an analogue CD, and connected to the CD driving motor 11. The driving IC 1 is electrically connected to both the CD driving motor 11 and the ejection motor 13 for activating the motor 11 to turn the turntable 12 and the motor to eject the turntable 12 for removal of the CD.

When the microprocessor 2 is activated, the same will make the high frequency amplifier 3 send out laser light, and make the CD digital processor 4 activate the laser pick-up 14 by means of the driving IC 1. The driving IC 1 will also activate the laser pick-up moving motor 15 to move the laser pick-up 14. The laser pick-up 14 sends a signal to the CD digital processor 4 via the high frequency amplifier 3 such that the CD digital processor 4 can inform the microprocessor 2 whether the laser light has focused; if the laser light fails to focus, the microprocessor 2 will stop; if the laser light has focused, the microprocessor 2 activates the CD digital processor 4 to make the CD driving motor 11 work via the driving IC 1 such that the analogue CD positioned on the turntable 12 is rotated at twice the normal speed. And, the laser pick-up 14 reads the data of the analogue CD, and sends the data to both the microprocessor 2 and the digital audio signal processor 5 via the high frequency amplifier 3 and the CD digital processor 4; the microprocessor 2 will also make the control panel 21 show information about the CD, the digital audio signal process 5 will store the data of the CD in the dynamic RAM 51.

The turnable control element 6 is made of conductive materials and preferably has a round shape, and electrically connected to the digital audio signal processor 5. The control element 6 normally sends out original signal 61, and will send out a glitch 62, which is stronger than the signal 61, when the same is touched or moved by a person. The glitch 62 will be sent to the digital audio signal processor 5 from the control element 6, and to the microprocessor 2 via the glitch detecting circuit 63, which will first process the glitch 62 before the microprocessor 2. The digital/analog converter 7 is electrically connected to both the digital audio signal processor 5 and the low pass filter 8. The microprocessor 2 can make comparison between the signal 61 and the glitch 62, and determine that a user has touched the control element 6 if the difference between the signal 61 and the glitch 62 exceeds a predetermined amount.

Thus, when a user such as a DJ rotates the turnable control element 6 such that the microprocessor 2 senses a big-enough difference between the glitch 62 and the signal 61, a sensor (not shown) of the control element 6 will senses the rotating speed and direction of the control element 6 so as to cause the digital audio signal processor 5 to process and sent out the data stored in the dynamic RAM 51 in a manner according to the movement of the control element 6, i.e. the user can decide on the item of the musical data to be played and the speed and the direction of the item being played. Then, the data is converted into analogue ones by the digital/analog converter 7. And, the analogue data are processed by the low pass filter 8, and sent out as music. When the user stops touching or moving the control element 6, the glitch 62 will disappear immediately, and accordingly the microprocessor 2 and the digital audio signal processor 5 will begin to play the music in the normal way.

From the above description, it can be understood that the digital audio signal player having a simulated analogue record of the present invention can store much more data than a conventional record, and can play the music with changed tone and speed when the control element is rotated by the user. And, because the turnable control element is not connected to any driving motor, the player will play the music in the normal way as soon as the user's hands leave the control element 6 to cause the glitch 62 to disappear. Therefore, there is no delay between the playing of the normal music and that of music with changed tone and speed.

What is claimed is:

1. A digital audio signal player having a simulated analogue record, comprising a driving IC;

a CD driving motor electrically connected to said driving IC for rotating a turntable provided for holding an analogue CD thereon;

an ejection motor electrically connected to said driving IC for ejecting said turntable so as to allow removal of said CD;

a laser pick-up capable of being moved by a laser pick-up moving motor connected to said driving IC;

a microprocessor;

a high frequently amplifier electrically connected to said microprocessor to be capable of sending out laser light when activated by said microprocessor;

said laser pick-up beginning to read data of said CD when said microprocessor activates a CD digital processor electrically connected to said laser pick-up;

said laser pick-up sending a signal to said CD digital processor via said high frequency amplifier about a status of focusing of said laser light; said microprocessor stopping working if said laser light fails to focus; said microprocessor activating said CD digital processor to make said CD driving motor begin to rotate said CD positioned on said turntable at twice a normal speed if said laser light has focused;

said laser pick-up sending data of said CD to both said microprocessor and a digital audio signal processor electrically connected to both said CD digital processor and said microprocessor;

said digital audio signal processor including a dynamic RAM and an analog/digital converter so as to be capable of storing digital data, into which said data of said CD are converted by said converter;

a control panel electrically connected to said microprocessor for showing information about said CD;

a digital/analog converter electrically connected to said digital audio signal processor;

a low pass filter electrically connected to said digital/analog converter; and characterized by a turnable control element made of conductive materials, and electrically connected to both said digital audio signal processor and said microprocessor; said turnable control element sending out an original signal when not touched by a person, and being capable of sending out a glitch stronger than said signal to said digital audio signal processor and to said microprocessor via a glitch detecting circuit when touched by a person; said glitch detecting circuit processing said glitch before said glitch is sent to said microprocessor;

on receiving said glitch, said microprocessor making a comparison between said original signal and said glitch for determining a difference between both so as to make said digital audio signal processor process and send out said digital data when said difference exceeds a predetermined amount;

said turnable control element having a sensor for sensing rotating speed and direction so as to cause said digital audio signal processor to process and send out said data in a manner according to a movement of said control element;

said data being sent to said digital/analog converter to be converted into analogue ones and played as music with said low pass filter after said conversion;

whereby a user can rotate said control element with a hand to decide on a item of said music to be played, and playing speed and direction of said item so as to play said music with changed tone and speed; said music being played in an original way as soon as said user removed said hand from said control element for disappearance of said glitch.

* * * * *